(12) United States Patent
Teloh et al.

(10) Patent No.: US 7,340,490 B2
(45) Date of Patent: Mar. 4, 2008

(54) STORAGE NETWORK DATA REPLICATOR

(75) Inventors: John Teloh, Fort Lauderdale, FL (US); Philip Newton, Epsom (GB); Simon Crosland, Woking (GB)

(73) Assignee: Sun Microsystems, Inc., Santa Clara, CA (US)

( * ) Notice: Subject to any disclaimer, the term of this patent is extended or adjusted under 35 U.S.C. 154(b) by 1118 days.

(21) Appl. No.: 09/988,854

(22) Filed: Nov. 19, 2001

(65) Prior Publication Data
US 2003/0014433 A1 Jan. 16, 2003

Related U.S. Application Data

(63) Continuation of application No. 09/905,436, filed on Jul. 13, 2001.

(51) Int. Cl.
*G06F 17/30* (2006.01)

(52) U.S. Cl. .................. 707/204; 707/202; 707/200

(58) Field of Classification Search ............ 707/202, 707/204, 205, 8, 9, 10, 200; 709/208, 201, 709/204, 226, 220, 203; 714/47, 22; 340/825
See application file for complete search history.

(56) References Cited

U.S. PATENT DOCUMENTS

| | | | | |
|---|---|---|---|---|
| 5,423,037 A | * | 6/1995 | Hvasshovd | ............ 707/202 |
| 5,502,443 A | * | 3/1996 | Newberry | ............ 340/825 |
| 5,613,079 A | * | 3/1997 | Debique et al. | ............ 711/141 |
| 5,832,222 A | * | 11/1998 | Dziadosz et al. | ............ 709/216 |
| 5,870,537 A | * | 2/1999 | Kern et al. | ............ 714/6 |
| 5,909,540 A | * | 6/1999 | Carter et al. | ............ 714/4 |
| 5,991,771 A | * | 11/1999 | Falls et al. | ............ 707/202 |
| 6,324,571 B1 | * | 11/2001 | Hacherl | ............ 709/208 |
| 6,324,654 B1 | * | 11/2001 | Wahl et al. | ............ 707/204 |
| 6,401,120 B1 | * | 6/2002 | Gamache et al. | ............ 709/226 |
| 6,587,970 B1 | * | 7/2003 | Wang et al. | ............ 714/47 |
| 6,658,590 B1 | * | 12/2003 | Sicola et al. | ............ 714/6 |
| 6,691,139 B2 | * | 2/2004 | Ganesh et al. | ............ 707/204 |
| 2002/0147774 A1 | * | 10/2002 | Lisiecki et al. | ............ 709/203 |

OTHER PUBLICATIONS

M. Satyanarayanan et al. USENIX Mobile & Location Independent computing sympsium. Paper. Aug. 2-3, 1993.*

* cited by examiner

*Primary Examiner*—Neveen Abel-Jalil
(74) *Attorney, Agent, or Firm*—Dorsey & Whitney LLP

(57) ABSTRACT

A method and apparatus for performing remote data replication. The method and apparatus can detect an interruption in the remote data replication process and begin local logging of all local data writes that occur while the remote data replication process is unavailable. The method and apparatus can perform remote data replication across multiple remote storage devices or the method and apparatus can replicate a data structure from a first storage device to multiple locations on one or more remote storage devices. In addition, the method and apparatus can halt the remote data replication and copy data from the local storage device to the remote storage device to ensure data uniformity on all storage devices.

11 Claims, 9 Drawing Sheets

STORAGE NETWORK DATA REPLICATOR

"This application is a continuation application of application Ser. No. 09/905,436 filed on Jul. 13, 2001, Pending. The contents of all of the aforementioned application(s) are hereby incorporated by reference."

RELATED APPLICATIONS

The current application claims priority from the Nonprovisional patent application Ser. No. 09/905,436 entitled STORAGE NETWORK DATA REPLICATOR which was filed on Jul. 13, 2001, naming the same inventors and the same assignee as this application, which is hereby incorporated by reference herein.

TECHNICAL FIELD OF THE INVENTION

The present invention generally relates to data networks, and more particularly, to network data replication.

BACKGROUND OF THE INVENTION

With accelerated business practices and the globalization of the marketplace, there is an ever increasing need for around the clock business communications and operations. As such, corporate data repositories must be able to provide critical business data at any moment in time in the face of interruptions caused by hardware failure, software failure, geographical disaster, or the like. To achieve the necessary data continuity and resilience for the present global marketplace, businesses utilize remote data repositories to backup and store critical business data.

One conventional method of data backup and storage is magnetic tape backup. At a business center, an amount of data, such as a day or a week, is transferred to a magnetic tape medium that is then stored remotely offsite. However, the magnetic tape medium is cumbersome to fetch in the event of a disaster and often requires significant amount of business center down time to restore the lost data.

Another conventional method utilized to avoid down time and provide disaster protection is database replication. With database replication, the database management system can make informed decisions on whether to write data to multiple local storage devices or a local storage device and to a remote storage device, but such synchronization comes at a significant performance penalty. The technique of writing data to multiple storage devices simultaneously is known as mirroring. In this manner, critical data can be accessible at all times. Ensuring transaction and record consistency often results in data transmission latency when a large number of data transmissions to remote sites are necessary with each database update. Consequently, application performance is slowed to unacceptable levels. In addition, database replication only performs replication only on data in the database and not on data in user files and system files. A separate remote copy facility is utilized to replicate such user files or system files.

In yet another data replication technique known as redundant array of independent disks (RAID), a host, such as a server or workstation, writes data to two duplicate storage devices simultaneously. In this manner, if one of the storage devices fails, the host can instantly switch to the other storage device without any loss of data or service. Nevertheless, to write to two duplicate storage devices simultaneously when one storage device is local and the other is remote is burdensome.

The mirroring of data to a distant location often faces remote data transmission limitations. For example, data transmission using a small computer system interface (SCSI) is limited to twenty-five meters. Typically, a SCSI parallel interface is used for attaching peripheral devices, such as a printer or an external storage device to a computer. Thus by utilizing a computer's SCSI port a computer can perform data mirroring by simultaneously writing to an internal storage device and an external storage device. Although discrete SCSI extenders are available, they become cumbersome and expensive beyond one or two remote connections.

One data transmission connection that is used for remote mirroring of data with an external storage device is the enterprise systems connection (ESCON) for use in mainframe systems. Unfortunately, ESCON has a maximum range of sixty kilometers.

A further example of a remote data transmission connection that is used for distant mirroring of data is fiber arbitrated loop (FCAL), which can distribute loop connections over 100 kilometers when properly equipped. Nevertheless, these data transmission connections do not provide the necessary long distance separation between an operational work center and the data repository to overcome regional disasters such as earthquakes, tornadoes, floods, and the like.

The above shortcomings can be overcome by use of a dedicated transmission medium between two sites, such as a high-speed fiber optic cable. However, most high speed transmission mediums are dedicated to telecommunications traffic. Moreover, the cost for a dedicated high-speed link makes such a choice prohibitive.

Another obstacle associated with long distance data mirroring is latency. That is, the round trip delay required to write data to the distant location and to wait for the remote storage device to be updated before mirroring the next data block. Typically, the latency is proportional to the distance between the two sites and can be heightened by intermediate extenders and communication protocol overhead. Consequently, application response slows to an unacceptable level.

A further obstacle to long distance data mirroring is compatibility among remote storage devices involved in the mirroring. As a result, a host having a data replication facility may replicate a data structure to one volume of the remote storage device at a time. Moreover, the host may not replicate the data further than the first remote storage device due to compatibility issues surrounding data transmission rates or host platform compatibility. These burdens place significant limitations on data protection schemes that require multiple remote storage devices.

SUMMARY OF THE INVENTION

The present invention addresses the above-described limitations of conventional data backup and storage operations. The present invention provides an approach to enable remote data mirroring amongst multiple remote storage devices across data transmission paths having various transmission capabilities and remote mirroring sites operating on various operating platforms.

In a first embodiment of the present invention, a method is practiced for replicating a data volume from a first computer to multiple remote data volumes on one or more remote computers. The first computer replicates the data volume and forwards the replicated data volume to the multiple remote data volumes on the one or more remote computers. The remote data volumes can reside on a storage device of a single remote computer or on multiple remote storage devices of multiple remote computers, or both. The first computer can forward the replicated data volume to the one or more remote computers in either a synchronous manner or an asynchronous manner. With either the asynchronous communication manner or the synchronous communication manner, the first computer forwards the replicated data volume using the Transmission Control Protocol/Internet Protocol (TCP/IP) protocol suite.

The above-described approach benefits a data storage network having data repositories dispersed over a large geographical area. Consequently, a central data center, such as a corporation's headquarters, a government agency or the like, can replicate data from a central repository to multiple remote repositories for purposes of data protection and to support data utilization by multiple employees and clients across a diverse geographical area.

In another embodiment of the present invention, a method is performed in a computer network, wherein each of the computers in the network host a data replication facility for remote mirroring of data between each of the network computers. Each data replication facility is able to receive data from its host, write the data to a local storage device and subsequently mirror the data to each of the computer network computers hosting a data replication facility for storage on a storage device of the remote computer host. Each data replication facility can replicate a logical data volume or a physical data volume to each of the other computers in the computer network or to multiple volumes on a single computer in the computer network. The computer network can be a local area network, a wide area network, a virtual private network, the Internet, or other network type.

The above-described approach benefits geographically remote data repositories that form a computer network in that as each remote data repository receives new data from its local host each of the other remote data repositories in the computer network can be updated in a simultaneous manner. In this manner, a network data replicator can replicate data to multiple storage devices with a single data replication operation.

In yet another aspect of the present invention, a computer readable medium holding computer executable instructions is provided that allows a first computer to replicate a data volume to multiple remote data volumes on one or more remote computers. The first computer replicates the data volume and in turn forwards the replicated data volume to the multiple remote data volumes on the one or more remote computers.

In accordance with another aspect of the present invention, a method for remote data mirroring is performed in a computer network. At a first network location, data is replicated to a remote network location within the computer network. At the remote location, the data is again replicated to a second remote network location. The network data transmission capability between the first network location and the first remote network location can be different from the network data transmission capability between the first remote location and the second remote network location. In addition, the first network location may replicate the data to the first remote network location in a synchronous manner, while the first remote network location replicates the data to the second remote network location in an asynchronous manner.

The above-described approach benefits a computer network, such as storage network that replicates data to multiple storage devices in the data network. As a result, a remote data repository can act as a remote storage location for some data and a local data replicator for other data. Moreover, the originating location in the storage network is no longer burdened with data transmission latency issues commonly associated with mirroring data to a remote location via a long haul network.

In yet another aspect of the present invention, a method for data replication from the first location to multiple remote locations is practiced. At the first location a selected data structure is replicated and transmitted to a first remote location for replication to a second remote location. The first remote location replicates the received replicated data and forwards the replication of the received data to the second remote location. Transmission between the originating location and each of the remote locations occurs in a stateless manner using the TCP/IP protocol suite. The transmission rate between the originating location and the first remote location can differ from the transmission rate between the first remote location and the second remote location. Moreover, the operating platform of the originating location can differ from the operating platform of the first remote location, which can differ from the operating platform of the second remote location.

The above-described approach benefits an enterprise having multiple geographically remote data centers operating on various platforms. In this manner, data produced at each data center can be replicated and transmitted to each other data center in the network regardless of operating platform and transmission line capability that connects one data center to another.

In still another aspect of the present invention, a computer readable medium holding computer executable instructions for replicating data from a first location to multiple remote locations is provided. The computer readable medium allows a computer at the first location to replicate a data structure from the first location and forward the replicated data structure to a first remote location for replication to the second remote location. The replicated data is transmitted to each remote location using the TCP/IP protocol suite.

In yet another aspect of the present invention, a method for remote mirroring of data in a computer network is practiced. The method allows for updating of one or more data structures of a remote storage device using a single data set. The one or more data structures are identified and selected from a local storage device. The data structures selected are more current than their corresponding data structure counterparts on a remote storage device. The selected data structures are grouped together as a single entity, while preserving the write ordering within each structure. The single data entity is then mirrored to the remote storage device to update the one or more corresponding data structure counterparts at the remote storage device.

In still another aspect of the present invention, a method is practiced in a computer network for remote mirroring of data from a first networked computer to one or more networked computers. The method provides for a first networked computer to log all local disk updates during a period of time when the remote mirroring of data cannot be accomplished. The first networked computer determines when remote mirroring of data can be re-established and groups all of its disk updates into a single data set. The first networked computer restarts the remote mirroring of data to one or more remote network computers when the remote mirroring of data is re-established.

BRIEF DESCRIPTION OF THE DRAWINGS

An illustrative embodiment of the present invention will be described below relative to the following drawings.

DETAILED DESCRIPTION

Figure 1:
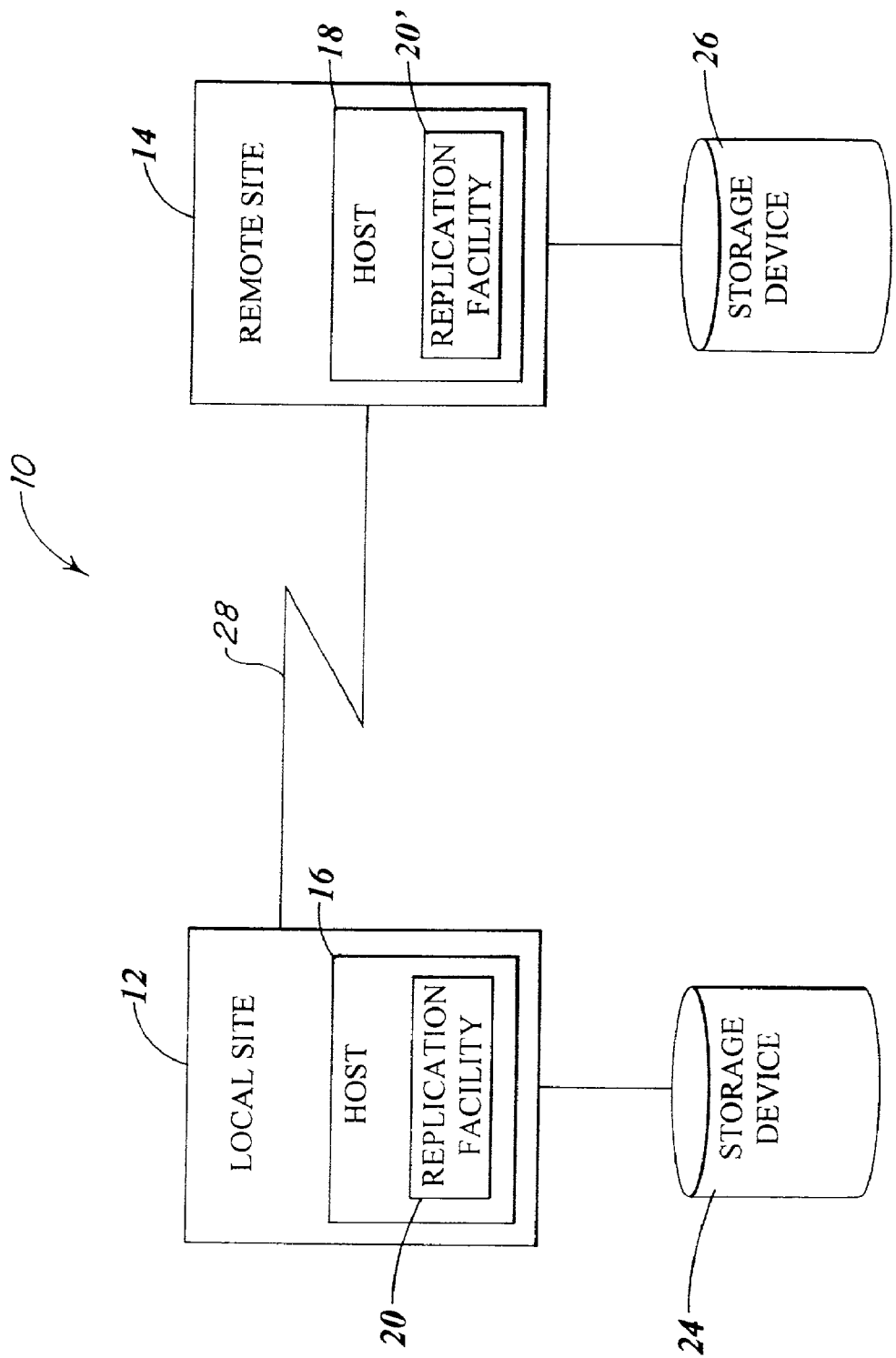
FIG. 1 depicts a block diagram of an exemplary system suitable for practicing the illustrative embodiment of the invention.

Before beginning with the discussion below it is helpful to first define a few terms.

The term "host" is a computer system, such as a PC, a workstation, a server, or the like, that is capable of supporting a data replication facility.

The term "volume" is an identifiable unit of data on a storage device, such as a disk or tape, it is possible for a the storage device to contain more than one volume or for a volume to span more than one storage device.

The illustrative embodiment of the present invention provides an approach for mirroring data from a local storage device to a remote storage device that overcomes the burdens commonly associated with mirroring data to a physically remote location. The illustrative embodiment of the present invention allows a local host with a data replication facility to replicate a volume of data to multiple secondary volumes on one or more remote hosts that also have a data replication facility. The local host along with each remote host can replicate data volumes without the use of a volume manager. In addition, the illustrative embodiment allows for each remote host to further replicate the data to additional remote hosts. In this manner, the local host can replicate data to one or more distant storage devices without concern for data transmission latency that would degrade application performance on the local host. The illustrative embodiment of the present invention improves fault tolerance of a distributed system and improves upon data availability and load balancing by replicating data to multiple hosts.

Those skilled in the art will recognize that the remote mirroring operation in the illustrative embodiment of the present invention can be occasionally interrupted, either intentionally or by unplanned outages. In such instances, if for example, the primary member of the volume pair, that is, the local volume, continues to update during the outage period, then the volume image pairs (local and remote) are no longer considered synchronized. As such, the term synchronize refers to the process of updating one or more replica volumes to reflect changes made in the primary volume. Hence, the term resynchronization refers to the process of reestablishing the mirroring process along with replicating all primary volume images that changed during the outage period to the one or more replica volumes so that all changes to the primary volume are reflected in the one or more replica volumes.

The illustrative embodiment of the present invention also improves the resynchronization of the remote mirroring process in the event that a failure occurs. The illustrative embodiment of the present invention tracks changes to disk regions that occur during the remote mirroring outage period. This allows changes that occur during the outage period to be easily identified and allows only the last change to a particular disk region to be replicated during the resynchronization. In this manner, multiple changed volumes of a data structure can be grouped into a single data set for resynchronization upon reestablishment of communications with the remote storage device. In addition, the illustrative embodiment of the present invention is able to halt the remote data mirroring to verify proper data replication on a remote storage device. In this manner, a data volume or a group of volumes on the local storage device of the local host provide a content baseline for determining if the content of the remote storage device of the remote host matches the content of the local storage device.

The illustrative embodiment of the present invention transmits data to perform the remote data mirroring using the TCP/IP protocol suite. As a result, the replicated data is able to share a transmission path with other IP traffic from unrelated applications. In this manner, the illustrative data replication facility is able to replicate data from different applications operating on different hosts that utilize distinct storage devices. By properly provisioning the common transmission path the data replication facility can route IP traffic from each application over the same link to a remote storage device.

The data replication facility of the illustrative embodiment supports synchronous data replication and asynchronous data replication. With synchronous data replication, the local site waits for confirmation from the remote site before initiating the next write to the local storage device. FIG. 1 illustrates an exemplary system 10 suitable for practicing the asynchronous and the synchronous data replication techniques of the illustrative embodiment. Synchronous data replication by the exemplary system 10 will be discussed below in detail with reference to FIG. 2. Asynchronous data replication by the exemplary system 10 will be discussed below in detail with reference to FIG. 3. Moreover, one skilled in the art will recognize the illustrative data replication facility can replicate data to locations that are within a few hundred feet of the data replication facility as well as replicate data to locations that are hundreds or thousands of miles away.

As shown in FIG. 1, the local site 12 includes a host 16 that supports the data replication facility 20 and is in communication with the storage device 24. Similarly, the remote site 14 includes a host 18 that supports the data replication facility 20' and is in communication with the remote storage device 26. Those skilled in the art will appreciate that the host 16 and 18 may be a workstation, a PC, a mainframe, a server or any combination thereof. The local site 12 and the remote site 14 communicate with each other via the communication link 28. The communication link 28 can be any suitable communication link, wired or wireless, that is suitable for transmission of information in accordance with the TCP/IP protocol suite. In addition, the local storage device 24 and the remote storage device 26 may be, but is not limited to an optical disk storage device, a magnetic disk storage device or any combination thereof.

The data replication facility 20 and 20' coordinate with each host to provide data replication operation and control. In this manner, the respective data replication facility 20 and 20' interface with an application performing a write operation on their respective host to control operation of the storage device local to the host and to interface with the remote data replication facility for replication of the just written data to the remote storage device. Those skilled in the art will recognize that the data replication facility 20 and 20' can replicate data in a bi-directional manner. That is, if, in the event of a disruption in the remote mirroring process, either the data replication facility 20 or the data replication facility 20' can be instructed to log each local write to the respective local storage device 24 and 26. Upon restoration of the remote mirroring process, data resynchronization can occur from the site selected to maintain a write log during the outage.

Typically when a remote mirroring outage occurs, the local site continues to write to the primary volumes on the local storage device 24, while the remote site 14 ceases all writes and awaits for the reestablishment of the remote mirroring process. In certain instances, the local site 12 as well as the remote site 14 can be instructed to log all local writes in the event of a remote mirroring outage. In this instance, upon reestablishment of the remote mirroring process, someone, such as a system administrator would make a decision as to the direction the resynchronization would occur. That is, from the remote site 14 to the local site 12 or from the local site 12 to the remote site 14. For the ease of the discussion below, the illustrative embodiment of the present invention will be discussed relative to data replication from the local site 12 to the remote site 14.

Figure 2:
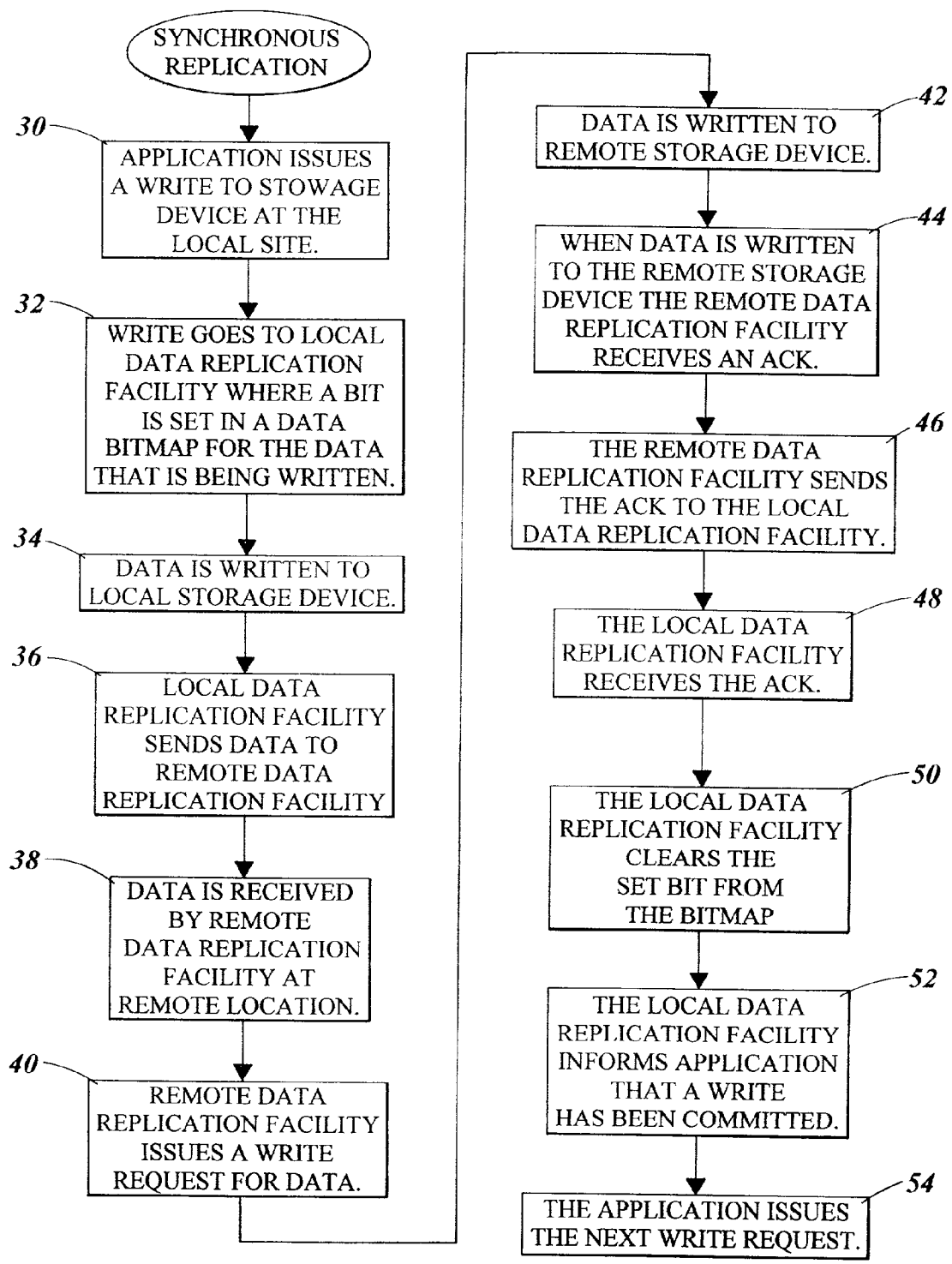
FIG. 2 is a flow chart that illustrates the steps taken by the illustrative embodiment of the invention to replicate data in a synchronous manner.

FIG. 2 illustrates in more detail the operation of the illustrative data replication facility of the present invention in a synchronous replication mode. At the local site 12, an application running on the host 16 first issues a write to the local storage device 24 (step 30). The write request first goes to the local data replication facility 20 operating on the host 16 of the local site 12 where the local data replication facility 20 sets a bit in a bitmap that represents the storage region of the storage device corresponding to where the data is written (step 32). The local data replication facility 20 then writes the data to the local storage device 24 (step 34). When the proper bit is set in the bitmap, the write occurs on the storage device of the local site. The bitmap is used to track data awaiting replication and is discussed in more detail below with reference to FIG. 4.

The local data replication facility 20 then replicates the data and forwards the data to the remote data replication facility 20' operating on the host 18 of the remote site 14 for remote data mirroring (step 36). The local data replication facility 20 forwards as part of the replicated data package information that identifies a storage location, such as a volume path, for the replicated data at the remote site 18. Those skilled in the art will recognize that the local data replication facility 20 can forward the data directly to the remote data replication facility 20' and can also forward the data through one or more intermediary mechanisms, such as a switch, a router, a network interface apparatus, a forwarding mechanism or the like. The data is received by the remote data replication facility 20' at the remote site 14 (step 38) at which time the remote data replication facility 20' issues a write request for the received data (step 40). The received data is then written to the remote storage device 26 of the remote site 14 (step 42). After the data is written to the remote storage device 26, the remote data replication facility 20' receives an acknowledgement from the host 18 of the remote site 14 (step 44) and forwards the acknowledgement to the local data replication facility 20 (step 46). When the local data replication facility 20 receives the acknowledgement (step 48) it clears the bit set in the bitmap (step 50). At this point the local data replication facility 20 informs the application operating on the local site host 16 that the write is complete (step 52) and the application issues the next write for the local storage device 24 (step 54).

Figure 3:
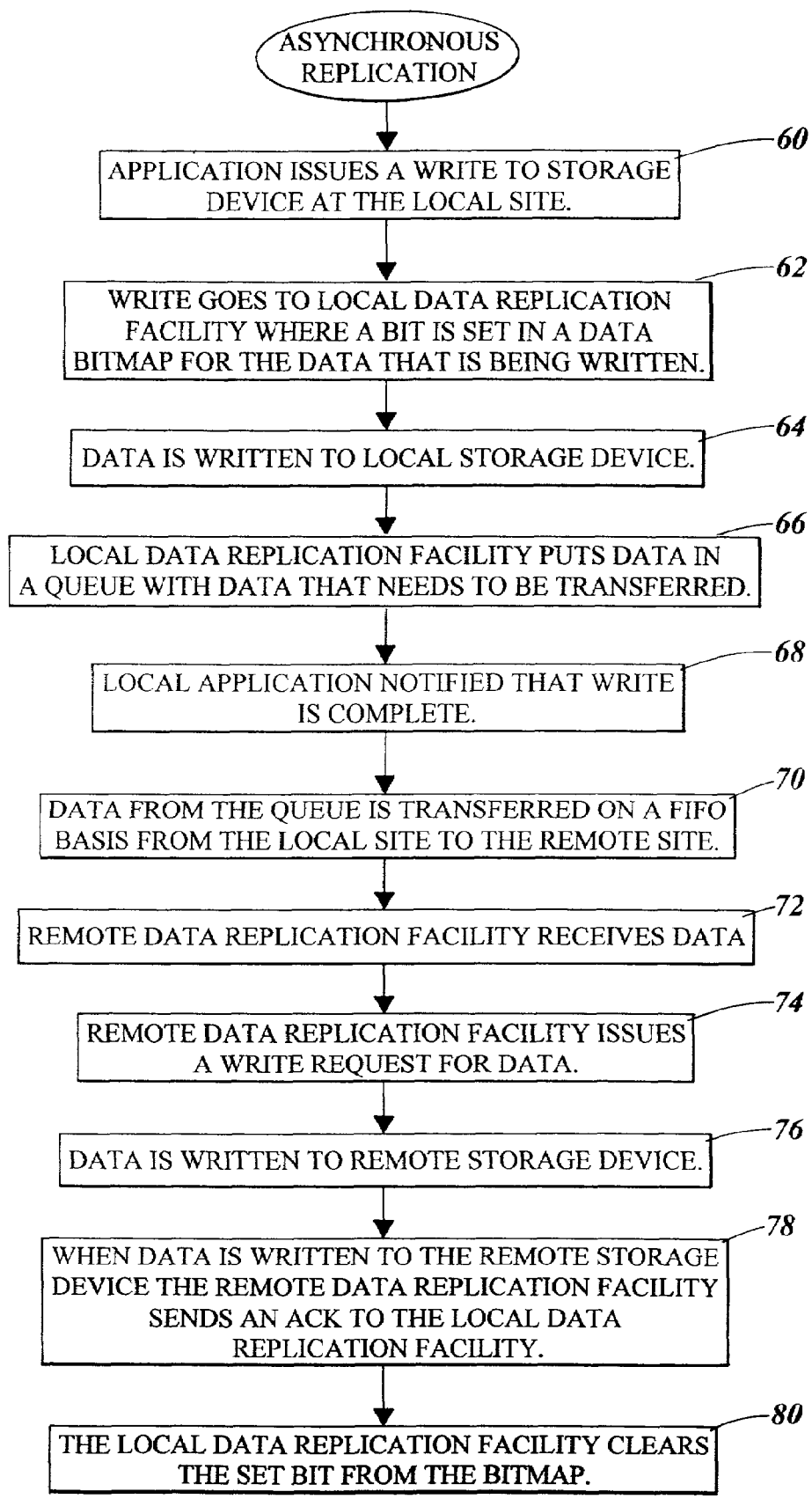
FIG. 3 is a block diagram of the steps taken by the illustrative embodiment of the present invention to replicate data in an asynchronous manner.

FIG. 3 illustrates a typical asynchronous data replication technique for mirroring data to a remote site. With reference to FIG. 1, the local host 16 confirms write completion to the local storage device 24 before the remote storage device 26 of the remote site 14 is written to. However, since the time needed for the data to cross the communication link 28 is significantly longer than the time needed for the local write to occur to the local storage device 24, the host 16 at the local site 12 queues the remote data writes for transmission at a later time.

The asynchronous operation of the illustrative data replication facility is as follows. An application operating on the host 16 of the local site 12 wishing to write data to the local storage device 24 first issues a write request to the local storage device 24 (step 60). The write first goes to the local data replication facility 20 operating on the host 16 of the local site 12 (step 62). The local data replication facility 20 for the local site 12 upon receipt of the write request sets a bit in a bitmap that corresponds to the data for the issued write request (step 62). The data is then written to the local storage device 24 of the local site 12 (step 64). At this point, the local data replication facility 20 copies the data into a queue to await forwarding to the remote storage device 26 of the remote site 14 (step 66). Those skilled in the art will recognize that the local data replication facility 20 can forward the data directly from the queue to the remote data replication facility 20' and can also forward the data through one or more intermediary mechanisms, such as a switch, a router, a network interface apparatus, a forwarding mechanism or the like. The local data replication facility 20 notifies the application operating on the local host 16 that the write is complete and the local storage device 24 is now ready for the next write (step 68).

The data from the queue is forwarded on a first in first out (FIFO) basis from the local site 12 to the remote site 14 (step 70). The data forwarded from the queue is packaged to include information that identifies a storage location at the remote host 18, such as a volume data path. Data is received at the remote site 14 by the remote data replication facility 20' operating on the remote host 18 (step 72). When data is received, the remote data replication facility 20' issues a write request for the received data (step 74). The received data is then written to the remote storage device 26 of the remote site 14 (step 76). Upon completion of the write at the remote site 14, the remote data replication facility 20' sends an acknowledgement to the local data replication facility 20 (step 78). Upon receipt of the acknowledgment from the remote data replicating facility 20', the local data replication facility 20 removes the corresponding bit from the bitmap to signify the remote write of the data completed and that the remote asynchronous data replication is complete for that data set (step 79).

To reduce the time necessary to resynchronize one or more remote storage devices with the local storage device after a remote mirroring outage, the illustrative embodiment of the present invention logs all local writes during the remote mirroring outage period. The data replication facility of the illustrative embodiment generally utilizes a bit vector scoreboard 80, illustrated in FIG. 4, to keep track of local storage device locations that change during the remote mirroring outage period.

Figure 4:
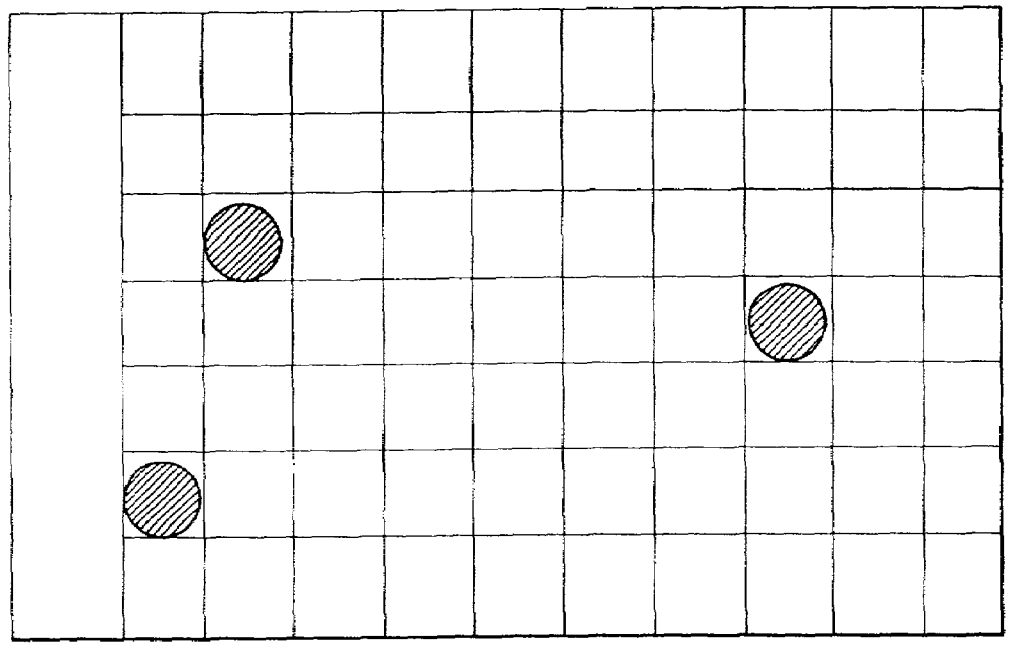
FIG. 4 depicts a log suitable for use by the illustrative embodiment of the present invention.

The exemplary scoreboard 80 of FIG. 4 provides a way to log changes during a remote mirroring outage. The exemplary scoreboard 80 holds bits that represent regions, such as tracks and sections of the local storage device that have been modified during the outage period. The exemplary scoreboard 80 can be configured to support different levels of granularity, for example, one bit for every 64 kbits or one bit for every 128 kbits of memory. The utilization of a scoreboard allows only the last update to the local storage device location to be resynchronized rather than all the preceding updates when the outage period ends. Consequently, the time required for the resynchronization process to occur is significantly reduced.

An important consideration in asynchronous data replication is ensuring that the remote writes are applied in the order in which they were posted by the local host application. For example, some data structures utilize a write ahead logging protocol to recover any table updates from a write ahead log that were not captured on disk due to media or other failure. Unfortunately in remote mirroring, the write ahead log and the table updates are typically deposited on different disk volumes. Consequently, when two separate applications are performing asynchronous writes, any attempt to replicate the data volumes to the remote storage device fails to preserve the correct write ordering. The illustrative data replication facility of the present invention is able to group together a structure, such as a write ahead log and a structure, such as a corresponding table entry into a single data set while preserving the write ordering for each asynchronous writer. In this manner, two separate processes or threads can run asynchronous to each other and can copy or mirror their respective volumes to remote storage devices while preserving their respective write order. Moreover, the data replication facility operator can instruct the illustrative data replication facility to select a number of identified volumes to form a group. The data replication facility operator supplies the illustrative data replication facility with the indicia to identify the volumes that should be grouped together when instructed to do so. In this manner, an application utilizing multiple volumes for write order sensitive data can be replicated as a group or single entity while preserving the write ordering of the data.

Figure 5:
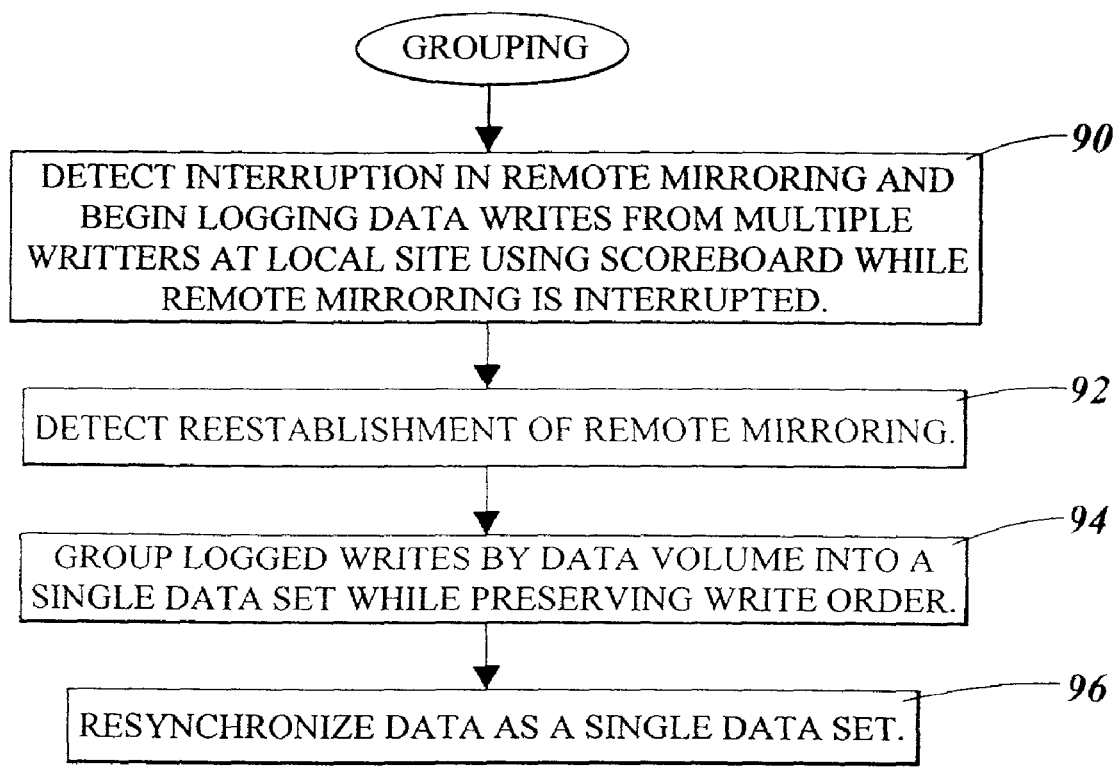
FIG. 5 is a block diagram illustrating the steps taken by the illustrative embodiment of the invention to group data.

As depicted in FIG. 5, the illustrative data replication facility of the present invention can automatically switch from replicating mode to data logging mode using the scoreboard 80, when a remote mirroring failure is detected (step 90). The operator of the illustrative embodiment can select, on a data structure basis, which data the illustrative data replication facility should log into the scoreboard 80 when remote mirroring is not available. Moreover, the local data replication facility can automatically resynchronize the logged data with the remote storage device upon the removal of the remote data mirroring interruption.

The local data replication facility may detect the reestablishment on its own or may receive notification from the local host (step 92). Consequently, a point in time can be easily identified for a data group across multiple volumes in the event that a remote mirroring failure occurs. In addition, the auto resynchronization technique supports the concept of grouping in which the illustrative data replication facility is able to group multiple data sets into a single entity through the use of a queue (step 94) and to resynchronize the data (step 96).

Figure 6:
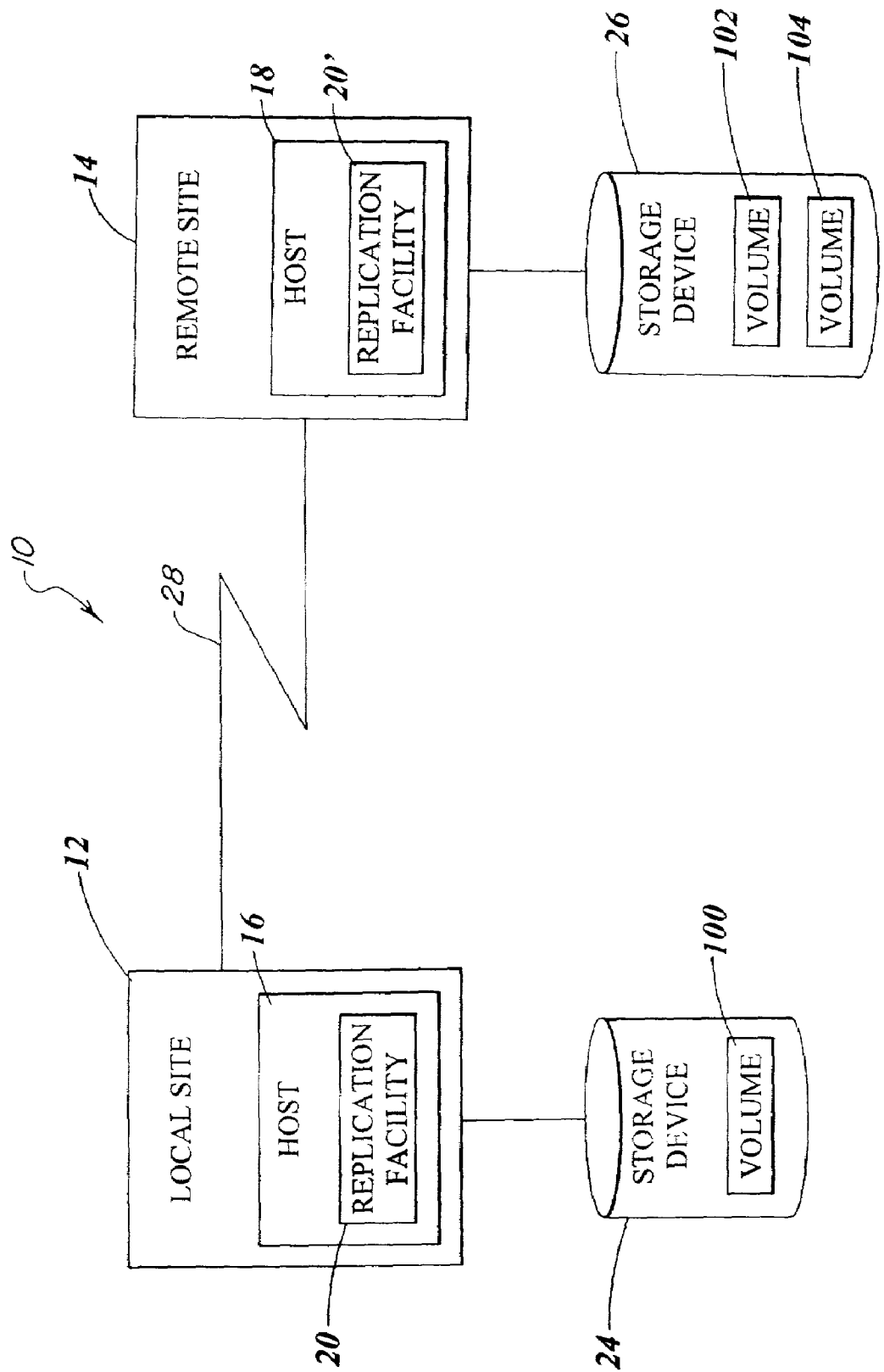
FIG. 6 depicts a block diagram of a system suitable for replicating data to multiple volumes using the illustrative embodiment of the present invention.
Figure 7:
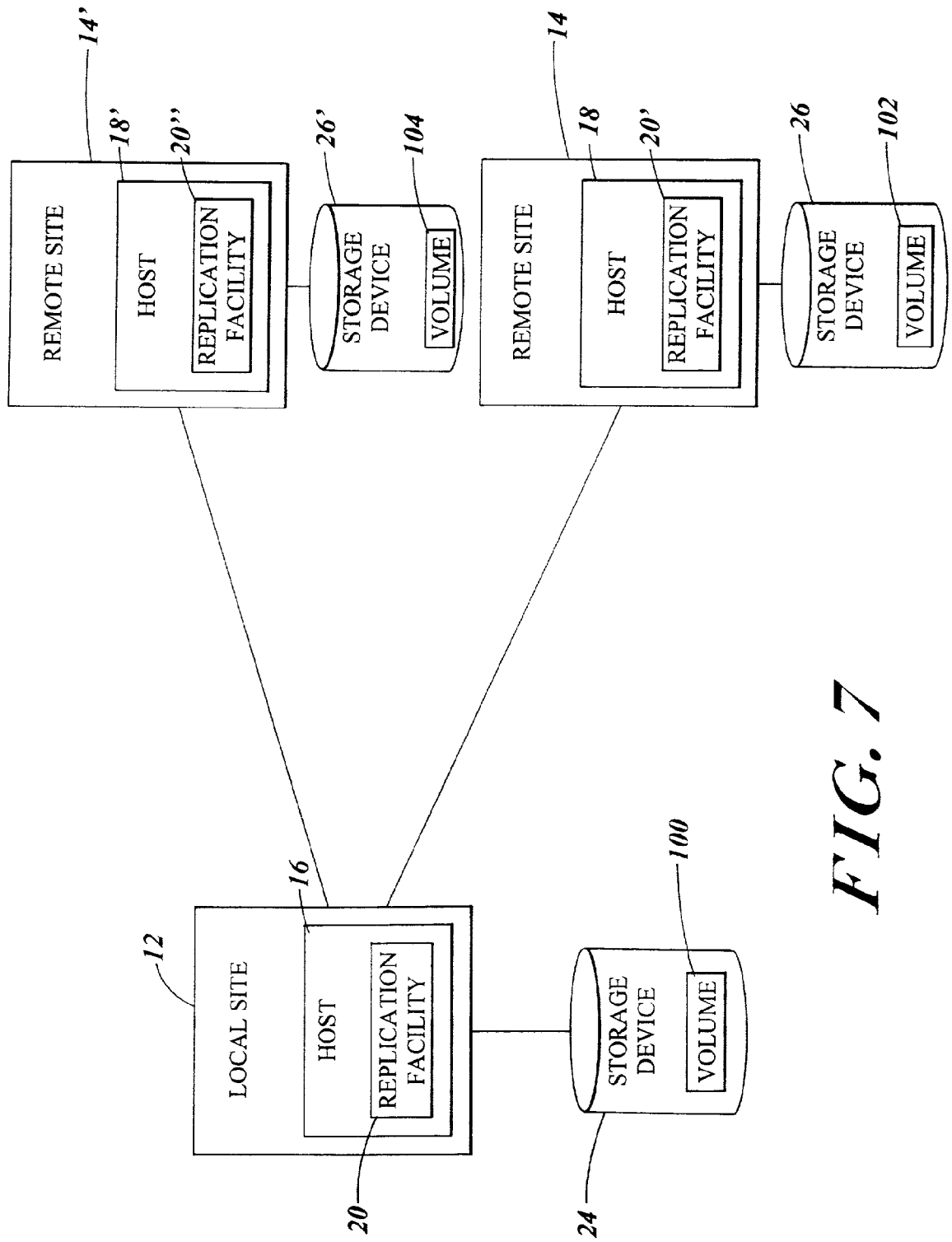
FIG. 7 depicts a block diagram of an exemplary system suitable for practicing the illustrative embodiment of the invention to replicate data to multiple volumes.

FIGS. 6 and 7 illustrate that the illustrative data replication facility is able to replicate a primary volume 100 from the local storage device 24 to multiple mirrored volumes 102 and 104 on one or more remote storage devices. FIG. 6 illustrates the situation in which the multiple mirrored volumes 102 and 104 are located on the same remote storage device 26 while FIG. 7 illustrates the situation in which the multiple mirrored volumes 102 and 104 are located on multiple remote storage devices 26 and 26' respectively.

Figure 8:
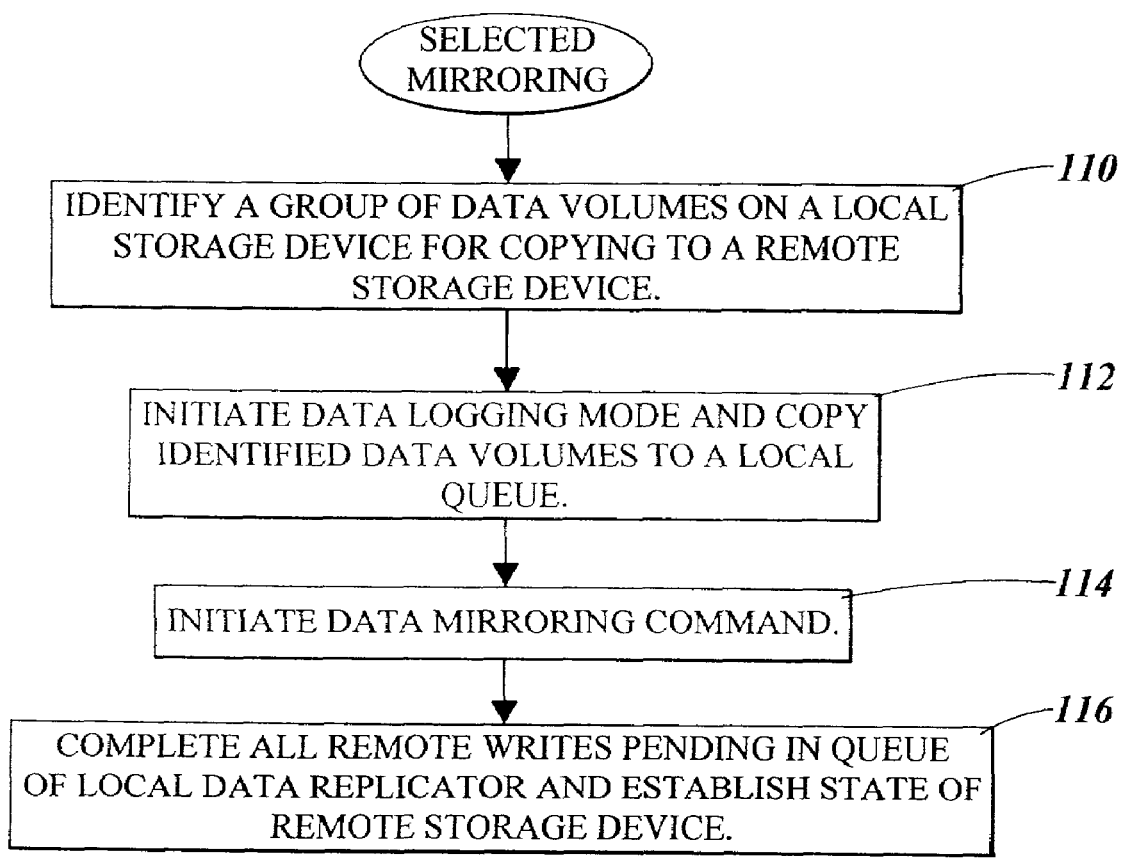
FIG. 8 is a flow diagram illustrating steps taken by the illustrative embodiment of the invention to perform selected mirroring of data.

To ensure the data on the remote storage device 26 matches the data on the local storage device 24, the local host 16 identifies to the local data replication facility 20 the data volumes from the local storage device 24 that are to be mirrored to the remote storage device 26 (step 110 in FIG. 8). Once the data volumes are identified, the local data replication facility 20 enters the data logging mode using the scoreboard 80 to track the disk areas that are being mirrored to the remote storage device 26 (step 112 in FIG. 8). The local data replication facility 20 logs the selected data to a local queue as a single group (step 112 in FIG. 8). The local host 16 sends the appropriate command to the remote host 18 and correspondingly the remote data replication facility 20' to initiate the routine to receive and store the selected data volumes on the remote storage device 26 (step 114 in FIG. 8). The local data replication facility 20 stops placing the selected data into the local queue and waits for all the selected data to be written from the local queue to the remote storage device 26. The data volume is assigned some type of indicia, such as a volume name or volume number, by the volume owner, for example, an application, the data owner or the data replication facility operator. The remote data replication facility 20' writes the replicated data volume to a location on the remote storage device 26 based on the volume name and the file allocation table of the remote storage device 26. At this point, the remote data replication facility 20' signals to the local data replication facility 20 that the mirroring to the remote storage device 26 is complete (step 116).

The ability to copy data from the local storage device 24 to the remote storage device 26 to ensure data uniformity in an asynchronous data mirroring environment does not impede any writes that occur to the local storage device 24 when remote mirroring is halted. The local data replication facility 20 is able to attend to the writes to the local storage device 24 by performing the local write and logging the local write to the scoreboard 80. Consequently, when the volume copying is complete, the local data replication facility 20 can resynchronize with the remote data replication facility 20' using the scoreboard 80 to update the remote storage device 26 with the local writes that occurred during the copy operation. Moreover, the local data replication facility 20 preserves the write ordering of all volumes copied during the copy operation.

Figure 9:
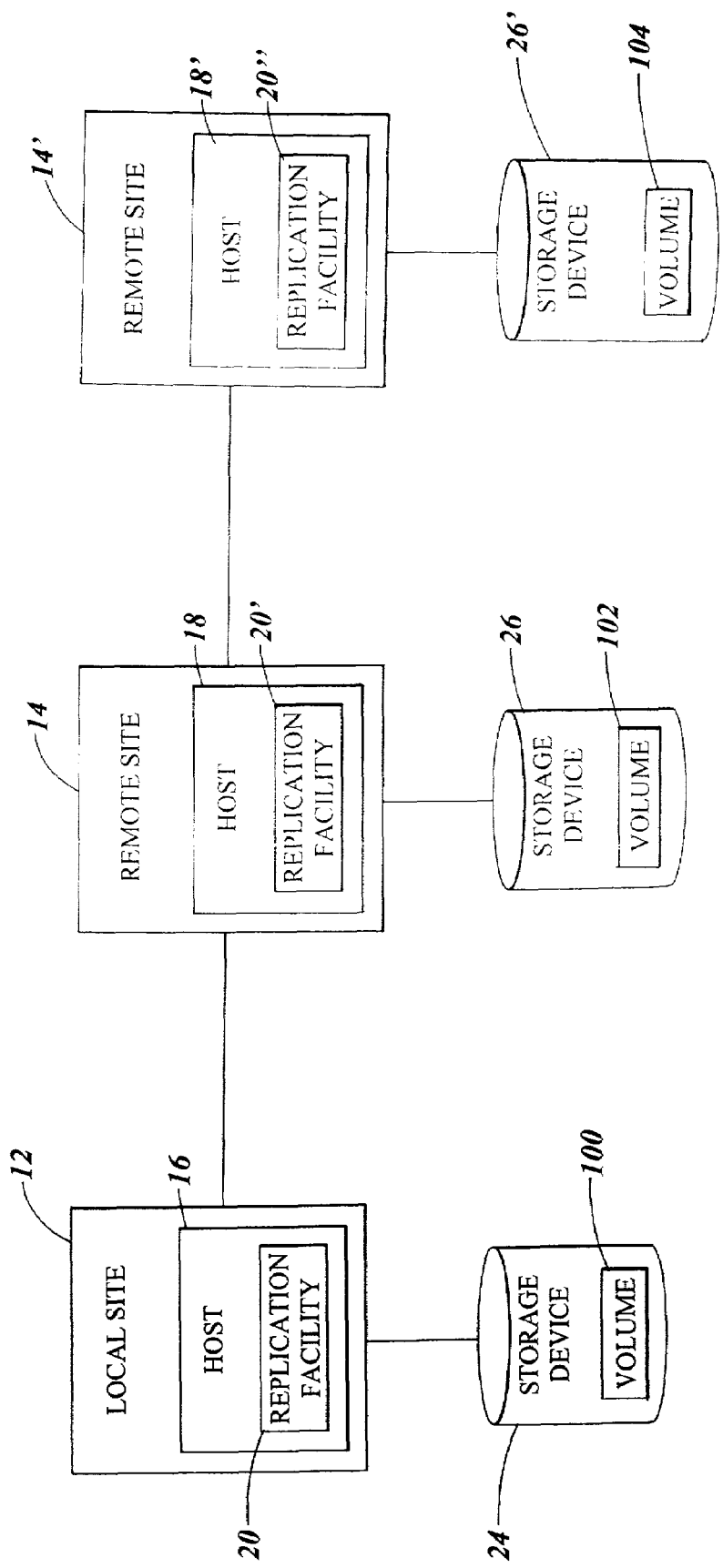
FIG. 9 depicts a block diagram of an exemplary system suitable for practicing the illustrative embodiment of the invention across multiple hosts.

The illustrative data replication facility of the present invention is able to remotely mirror data across multiple remote hosts and remote sites that have distinct characteristics as illustrated in FIG. 9. For example, the illustrative data replication facility 20 may replicate to a remote host 14 operating on the Solaris® operating system available from Sun Microsystems, Inc. of Palo Alto, Calif., and the data replication facility 20' at the remote host 14, in turn, replicates the same data to the remote host 14' operating on the Unix® operating system. In similar fashion, the transmission medium interconnecting each remote site may have a different bandwidth characteristic that effects the rate at which replicated data can be transmitted from site to site. As FIG. 9 illustrates, the illustrative data replication facility 20 operating on the local host 12 is able to remotely mirror data to multiple remote sites 14 and 14'. As illustrated, the remote data replication facility 20' operating on the host 18 of the first remote site 14 becomes the local data replication facility, as referenced to the remote data replication facility 20" operating on the host 18' of the second remote site 14'. In this manner, each intermediate host can further mirror the data from the originating local site to as many remote sites as necessary while overcoming the incompatibility issues previously associated with the remote mirroring of data across multiple remote sites.

While the present invention has been described with reference to a preferred embodiment thereof, one skilled in the art will appreciate that various changes in form and detail may be made without departing from the intended scope of the present invention as defined in the pending claims.

What is claimed is:

1. In a storage network, a method to update a first replica held by a physically remote storage device in said storage network, said method comprising the steps of:
   instructing a first data replication facility of a first electronic device in said storage network to log one or more writes to a local storage device when said first replica held by said physically remote storage device is unavailable due to a detected error condition in the storage network;
   determining at said first electronic device when said detected error condition no longer exists in the storage network;
   upon determination that said detected error condition no longer exists, instructing said first data replication facility of said first electronic device to replicate data corresponding to the one or more writes identified in said log to generate a second replica;
   outputting said second replica in accordance with a communication protocol from said first electronic device to a second data replication facility of a second electronic device of said physically remote storage device in said storage network to update said first replica; and
   instructing said first data replication facility of said first electronic device to automatically output said second replica to said second replication facility once generation of said second replica is complete.

2. In a storage network, a method to update a first replica held by a physically remote storage device in said storage network, said method comprising the steps of:
   instructing a first data replication facility of a first electronic device in said storage network to log one or more writes to a local storage device when said first replica held by said physically remote storage device is unavailable due to a detected error condition in the storage network;
   determining at said first electronic device when said detected error condition no longer exists in the storage network;
   upon determination that said detected error condition no longer exists, instructing said first data replication facility of said first electronic device to replicate data corresponding to the one or more writes identified in said log to generate a second replica;
   outputting said second replica in accordance with a communication protocol from said first electronic device to a second data replication facility of a second electronic device of said physically remote storage device in said storage network to update said first replica; and
   wherein said outputting from said first data replication facility of said first electronic device to said second data replication facility of said second electronic device occurs in a synchronous manner.

3. In a storage network, a method to update a first replica held by a physically remote storage device in said storage network, said method comprising the steps of:
   instructing a first data replication facility of a first electronic device in said storage network to log one or more writes to a local storage device when said first replica held by said physically remote storage device is unavailable due to a detected error condition in the storage network;
   determining at said first electronic device when said detected error condition no longer exists in the storage network;
   upon determination that said detected error condition no longer exists, instructing said first data replication facility of said first electronic device to replicate data corresponding to the one or more writes identified in said log to generate a second replica;
   outputting said second replica in accordance with a communication protocol from said first electronic device to a second data replication facility of a second electronic device of said physically remote storage device in said storage network to update said first replica; and
   wherein said communication protocol comprises the Transmission Control Protocol/Internet Protocol (TCP/IP) protocol suite.

4. In a storage network, a method to update a first replica held by a physically remote storage device in said storage network, said method comprising the steps of:
   instructing a first data replication facility of a first electronic device in said storage network to log one or more writes to a local storage device when said first replica held by said physically remote storage device is unavailable due to a detected error condition in the storage network;
   determining at said first electronic device when said detected error condition no longer exists in the storage network;
   upon determination that said detected error condition no longer exists, instructing said first data replication facility of said first electronic device to replicate data corresponding to the one or more writes identified in said log to generate a second replica;
   outputting said second replica in accordance with a communication protocol from said first electronic device to a second data replication facility of a second electronic device of said physically remote storage device in said storage network to update said first replica; and
   wherein said log comprises a bitmap holding one or more bits, wherein each of the one or more bits in the bit map indicates a storage location written to on the local storage device.

5. In a computer network having a plurality of programmable electronic devices, wherein each of said plurality of programmable electronic devices operates as a host device for a data replication facility for replicating data among said plurality of programmable electronic devices, a method to handle a communication link failure in said computer network, said method comprising the steps of:
   instructing each said data replication facility of each of said plurality of programmable electronic devices to enter a logging routine when said host device of said data replication facility detects said communication link failure, wherein said logging routine halts said replicating of data by said replication facility of said host device and said replication facility of said host device identifies in a log each local write of said host device that detects said communication link failure;

instructing each said data replication facility of each of said plurality of programmable electronic devices that initiated said logging routine to generate a replica for each said local write identified in said log upon reestablishment of said communication link;

grouping each said replica into a single data set; and forwarding said single data set in accordance with a communication protocol from a first of said plurality of programmable electronic devices to a second of said plurality of programmable electronic devices.

6. The method of claim 5, wherein said first of said plurality of programmable electronic devices forwards said single data set in a synchronous manner.

7. The method of claim 5, wherein said communication protocol comprises the Transmission Control Protocol/Internet Protocol (TCP/IP) protocol suite.

8. A readable medium holding programmable electronic device readable instructions to perform a method in a storage network to update a first replica held by a physically remote storage device in said storage network, said method comprising the steps of:

instructing a first data replication facility of a first programmable electronic device in said storage network to enter a first state to log, one or more writes to a local storage device when said first replica held by said physically remote storage device is unavailable due to a detected error condition that does not allow transmission of data to said physically remote storage device;

determining at said first programmable electronic device when said first replica held by said physically remote storage device is available due an abatement of the detected error condition;

instructing said first data replication facility of said first programmable electronic device to replicate data corresponding to the one or more writes identified in said log in order to create a second replica upon determination by said first programmable electronic device that said first replica held by said physically remote storage device is available;

outputting said second replica in accordance with a communication protocol from said first programmable electronic device to a second data replication facility of a second programmable electronic device in communication with said physically remote storage device in said storage network to update said first replica; and instructing said first data replication facility of said first programmable electronic device to automatically transmit said second replica to said second replication facility once creation of said second replica is complete.

9. A readable medium holding programmable electronic device readable instructions to perform a method in a storage network to update a first replica held by a physically remote storage device in said storage network, said method comprising the steps of:

instructing a first data replication facility of a first programmable electronic device in said storage network to enter a first state to log, one or more writes to a local storage device when said first replica held by said physically remote storage device is unavailable due to a detected error condition that does not allow transmission of data to said physically remote storage device;

determining at said first programmable electronic device when said first replica held by said physically remote storage device is available due an abatement of the detected error condition;

instructing said first data replication facility of said first programmable electronic device to replicate data corresponding to the one or more writes identified in said log in order to create a second replica upon determination by said first programmable electronic device that said first replica held by said physically remote storage device is available;

outputting said second replica in accordance with a communication protocol from said first programmable electronic device to a second data replication facility of a second programmable electronic device in communication with said physically remote storage device in said storage network to update said first replica; and wherein said outputting from said first data replication facility of said first programmable electronic device to said second data replication facility of said second programmable electronic device occurs in a synchronous manner.

10. A readable medium holding programmable electronic device readable instructions to perform a method in a storage network to update a first replica held by a physically remote storage device in said storage network, said method comprising the steps of:

instructing a first data replication facility of a first programmable electronic device in said storage network to enter a first state to log, one or more writes to a local storage device when said first replica held by said physically remote storage device is unavailable due to a detected error condition that does not allow transmission of data to said physically remote storage device;

determining at said first programmable electronic device when said first replica held by said physically remote storage device is available due an abatement of the detected error condition;

instructing said first data replication facility of said first programmable electronic device to replicate data corresponding to the one or more writes identified in said log in order to create a second replica upon determination by said first programmable electronic device that said first replica held by said physically remote storage device is available;

outputting said second replica in accordance with a communication protocol from said first programmable electronic device to a second data replication facility of a second programmable electronic device in communication with said physically remote storage device in said storage network to update said first replica; and wherein said communication protocol comprises the Transmission Control Protocol/Internet Protocol (TCP/IP) protocol suite.

11. A readable medium holding programmable electronic device readable instructions to perform a method in a storage network to update a first replica held by a physically remote storage device in said storage network, said method comprising the steps of:

instructing a first data replication facility of a first programmable electronic device in said storage network to enter a first state to log, one or more writes to a local storage device when said first replica held by said physically remote storage device is unavailable due to a detected error condition that does not allow transmission of data to said physically remote storage device;

determining at said first programmable electronic device when said first replica held by said physically remote storage device is available due an abatement of the detected error condition;

instructing said first data replication facility of said first programmable electronic device to replicate data corresponding to the one or more writes identified in said log in order to create a second replica upon determination by said first programmable electronic device that said first replica held by said physically remote storage device is available;

outputting said second replica in accordance with a communication protocol from said first programmable electronic device to a second data replication facility of a second programmable electronic device in communication with said physically remote storage device in said storage network to update said first replica; and wherein said log comprises a bitmap to hold one or more pointers, wherein each of the one or more pointers indicate a location on a storage device written to during said first state.

* * * * *